(12) United States Patent
Hasegawa et al.

(10) Patent No.: US 7,539,352 B2
(45) Date of Patent: May 26, 2009

(54) IMAGE FILTER, IMAGE FILTERING METHOD AND COMPUTER PROGRAM

(75) Inventors: Hiromu Hasegawa, Osaka (JP); Munehiro Mori, Osaka (JP); Nobuhiro Minami, Osaka (JP)

(73) Assignee: MegaChips LSI Solutions Inc., Osaka-shi (JP)

( * ) Notice: Subject to any disclaimer, the term of this patent is extended or adjusted under 35 U.S.C. 154(b) by 612 days.

(21) Appl. No.: 11/316,743

(22) Filed: Dec. 27, 2005

(65) Prior Publication Data

US 2006/0159361 A1    Jul. 20, 2006

(30) Foreign Application Priority Data

Jan. 19, 2005    (JP) ............................... 2005-011301

(51) Int. Cl.
*G06K 9/40* (2006.01)
(52) U.S. Cl. ...................................... 382/260; 382/275
(58) Field of Classification Search ......... 382/260–265, 382/274, 275, 300
See application file for complete search history.

(56) References Cited

U.S. PATENT DOCUMENTS

| | | | | |
|---|---|---|---|---|
| 5,390,264 A * | 2/1995 | Ishihara et al. | ............... | 382/260 |
| 5,448,654 A * | 9/1995 | Katayama et al. | ............ | 382/298 |
| 5,717,782 A * | 2/1998 | Denneau, Jr. | ................ | 382/154 |
| 6,141,461 A * | 10/2000 | Carlini | ........................ | 382/261 |
| 6,747,697 B1 * | 6/2004 | Lin et al. | ..................... | 348/246 |
| 7,242,819 B2 * | 7/2007 | Jiang | ........................... | 382/300 |
| 7,342,688 B2 * | 3/2008 | Chen et al. | .................. | 358/3.04 |
| 7,373,020 B2 * | 5/2008 | Tsukioka | ..................... | 382/300 |
| 7,437,013 B2 * | 10/2008 | Anderson | .................... | 382/261 |
| 7,440,612 B2 * | 10/2008 | Ogata et al. | .................. | 382/167 |

FOREIGN PATENT DOCUMENTS

JP    6-178165    6/1994

* cited by examiner

*Primary Examiner*—Kanji Patel
(74) *Attorney, Agent, or Firm*—Oblon, Spivak, McClelland, Maier & Neustadt, P.C.

(57) ABSTRACT

A first pixel group containing a pixel of interest, a second pixel group containing the first pixel group, and a third pixel group containing the second pixel group are defined. A first reference pixel value is calculated based on the first pixel group, and a second reference pixel value is calculated based on the third pixel group. The second pixel group is divided into two sub-groups with respect to the second reference pixel value. The sub-group containing the pixel of interest is selected as a target set. In the target set, a pixel with a pixel value close to the first reference pixel value is selected as a corrective pixel. The pixel value of the pixel of interest is replaced with the pixel value of the corrective pixel.

45 Claims, 9 Drawing Sheets

IMAGE FILTER, IMAGE FILTERING METHOD AND COMPUTER PROGRAM

BACKGROUND OF THE INVENTION

1. Field of the Invention

The present invention relates to filtering for reducing noise in images.

2. Description of the Background Art

A mean filter and a median filter are used to reduce noise in images. The mean filter is used to calculate the average pixel value of a pixel of interest and its neighboring pixels to replace the value of the pixel of interest with this average pixel value. Namely, the intensity of the pixel of interest, or whether the pixel of interest is black or white is determined by the use of the mean filter. The mean filter serves to filter out high frequency components of an image, to thereby realize noise removal and prevention of blurring.

However, the mean filter suffers from blurring of high frequency components. In contrast, a non-linear filter typified by a median filter has received attention by reason of simple algorithm, excellence in edge conservation, no degradation of afterimage in principle that is unavoidable annoyance to cyclic noise reduction, and the like.

According to the technique introduced in Japanese Patent Application Laid-Open No. 4-235472 (1992), an image signal given from a solid state imaging device is subjected to the processing using the median filter to correct data error caused by flaws or defects in pixels. According to the filtering technique introduced in Japanese Patent Application Laid-Open No. 6-178165 (1994), the average pixel value of a pixel of interest and its neighboring pixels is calculated, and a pixel with a pixel value closest to the average pixel value is selected from the neighboring pixels including the pixel of interest to be applied for use as a corrective pixel.

However, the technique introduced in Japanese Patent Application Laid-Open No. 4-235472 fails to perform accurate correction in the event that data error continuously occurs in the neighborhood of a pixel of interest, for example. Namely, data correction cannot be realized when a median value itself largely deviates from the original pixel value of a pixel of interest. The technique introduced in Japanese Patent Application Laid-Open No. 6-178165 is intended to remove or reduce Gaussian noise. This technique fails to perform accurate correction, in the event that a distribution of pixel values in a region targeted for the calculation of an average value and a distribution of pixel values of neighboring pixels including a pixel of interest are significantly different from each other, for example.

SUMMARY OF THE INVENTION

The present invention is intended to provide an image filtering technique to be effectively applied for noise reduction in images.

An image filter according to a first aspect of the present invention is intended to filter a pixel of interest using the pixel of interest and its neighboring pixels. In the image filter of the first aspect, a first pixel group containing the pixel of interest, a second pixel group containing the first pixel group, and a third pixel group containing the second pixel group are defined relative to the pixel of interest. The image filter of the first aspect comprises: a calculation part for calculating a first reference pixel value based on pixels contained in the first pixel group, and calculating a second reference pixel value based on pixels contained in the third pixel group; a judgment part for dividing the second pixel group into two sub-groups, and selecting one of the two sub-groups containing the pixel of interest as a target set, the two sub-groups including one sub-group containing pixels with pixel values greater than the second reference pixel value and the other sub-group containing pixels with pixel values smaller than the second reference pixel value; a selection part for selecting a pixel with a pixel value closest to the first reference pixel value as a corrective pixel from pixels contained in the target set; and an output part for outputting the pixel value of the corrective pixel as the pixel value of the pixel of interest.

An image filter according to a second aspect of the present invention is intended to filter a pixel of interest using the pixel of interest and its neighboring pixels. In the image filter of the second aspect, a first pixel group containing the pixel of interest, a second pixel group containing the first pixel group, and a third pixel group containing the second pixel group are defined relative to the pixel of interest. The image filter of the second aspect comprises: a calculation part for calculating a first reference pixel value based on pixels contained in the first pixel group, and calculating a second reference pixel value based on pixels contained in the third pixel group; a judgment part for dividing the second pixel group into two sub-groups, and selecting one of the two sub-groups containing a larger number of pixels as a target set, the two sub-groups including one sub-group containing pixels with pixel values greater than the second reference pixel value and the other sub-group containing pixels with pixel values smaller than the second reference pixel value; a selection part for selecting a pixel with a pixel value closest to the first reference pixel value as a corrective pixel from pixels contained in the target set; and an output part for outputting the pixel value of the corrective pixel as the pixel value of the pixel of interest.

A image filter according to a third aspect of the present invention is intended to filter a pixel of interest using the pixel of interest and its neighboring pixels. In the image filter of the third aspect, a first pixel group containing the pixel of interest, a second pixel group containing the first pixel group, and a third pixel group containing the second pixel group are defined relative to the pixel of interest. The image filter of the third aspect comprises: a calculation part for calculating a first reference pixel value based on pixels contained in the first pixel group, and calculating a second reference pixel value based on pixels contained in the pixel group; a judgment part for dividing the second pixel group into two sub-groups, and selecting one of the two sub-groups in which the first reference pixel value exists within a range of not less than a minimum pixel value and not more than a maximum pixel value as a target set, the two sub-groups including one sub-group containing pixels with pixel values greater than the second reference pixel value and the other sub-group containing pixels with pixel values smaller than the second reference pixel value; a selection part for selecting a pixel with a pixel value closest to the first reference pixel value as a corrective pixel from pixels contained in the target set; and an output part for outputting the pixel value of the corrective pixel as the pixel value of the pixel of interest.

The present invention is also intended for an image filtering method for filtering a pixel of interest using the pixel of interest and its neighboring pixels.

The present invention is still intended for a computer program causing a computer to implement an image filtering method for filtering a pixel of interest using the pixel of interest and its neighboring pixels.

According to the present invention, the first pixel group containing the pixel of interest, the second pixel group containing the first pixel group, and the third pixel group containing the second pixel group are applied for use in the filtering. The second reference pixel value is calculated based on the third pixel group, and the target set is determined based on the second reference pixel value. This means pixel variations in the wide area in the neighborhood of the pixel of interest can be taken into consideration for defining the target set. The first reference pixel value is calculated based on the first pixel group covering a limited area in the neighborhood of the pixel of interest, and a pixel with a value close to the first reference pixel value is applied for use as a corrective pixel. Thus the corrective pixel can be responsive to local pixel variations around the pixel of interest. Further, the target set is selected from the second pixel group covering an area smaller than that of the third pixel group. Thus the required amount of calculation can be reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
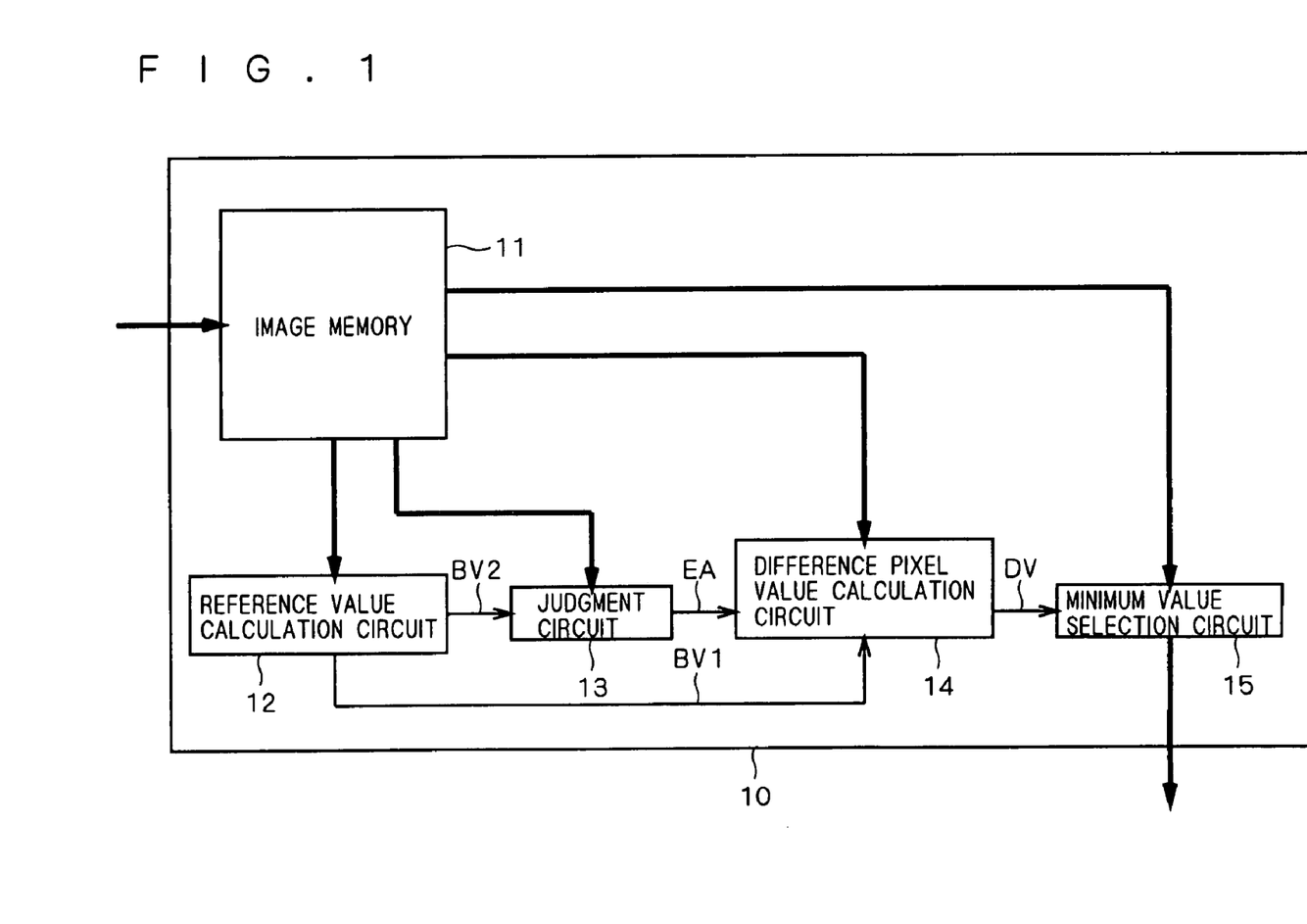
FIG. 1 is a circuit diagram of an image filter according to preferred embodiments of the present invention.

Preferred embodiments of the present invention will be described with reference to the accompanying drawings. FIG. 1 is a circuit diagram of an image filter 10 according to a first preferred embodiment of the present invention. The image filter 10 comprises an image memory 11, a reference value calculation circuit 12, a judgment circuit 13, a difference pixel value calculation circuit 14 and a minimum value selection circuit 15.

Figure 2:
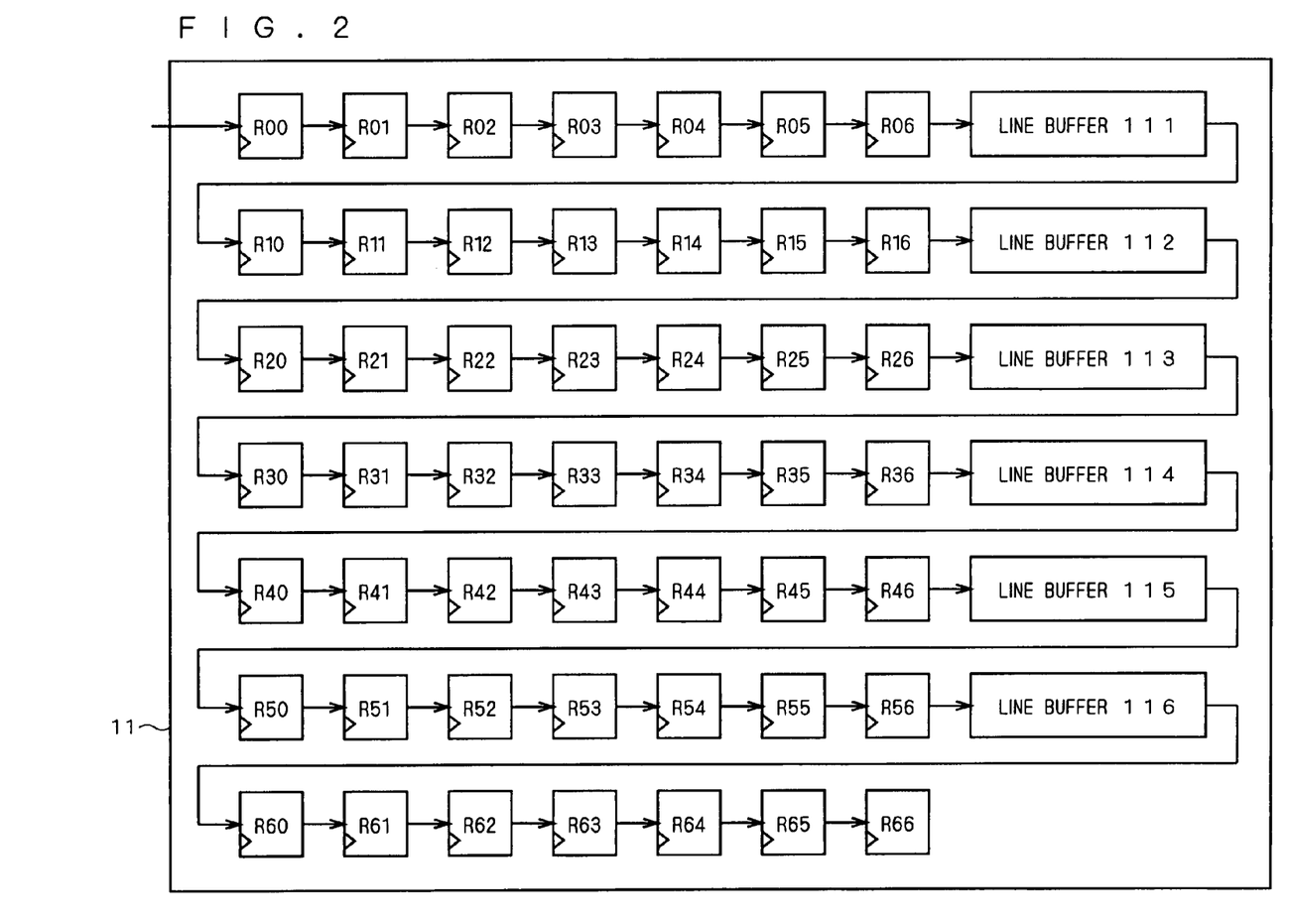
FIG. 2 shows a circuit configuration of an image memory.

With reference to FIG. 2, the image memory 11 has 49 registers R00, R01, ... R66 and six line buffers 111, 112, ... 116. The 49 registers R00, R01, ... R66 each have a storage area capable of storing pixel data corresponding to one pixel. Assuming that each horizontal line of image data received by the image filter 10 contains N pixels, the line buffers 111, 112, ... 116 are FIFO memories each capable of storing pixel data corresponding to (N-7) pixels.

A more specific configuration will be discussed. In a first line, the registers R00, R01, ... R06 are connected in series. The line buffer 111 is arranged in a post stage of the resisters R00, R01, . . . R06. In a second line, the registers R10, R11, ... R16 are connected in series and are arranged in a post stage of the line buffer 111. The line buffer 112 is arranged in a post stage of the registers R10, R11, ... R16. In a third line, the registers R20, R21, ... R26 are connected in series and are arranged in a post stage of the line buffer 112. The line buffer 113 is arranged in a post stage of the registers R20, R21, ... R26. Likewise, seven registers and a line buffer are alternately connected, whereby the series connection of the 49 registers R00, R01, ... R66 and the seven line buffers 111, 112, ... 116 is formed as shown in FIG. 2.

When a clock signal is given, the registers R00, R01, ... R066 each transfer pixel data stored therein to a post-stage register. The clock signal also triggers each of the line buffers 111, 112, ... 116 to receive new pixel data from an ante-stage register, and to transfer pixel data received (N-7) clocks ago to a post-stage register. That is, pixel data is stored in the line buffer during a time interval of (N-7) clocks, and is thereafter transferred to a post-stage register.

With the configuration of the image memory 11 discussed above, pixel data given to the image memory 11 is first stored in the register R00, thereafter moving to a serially-connected post-stage register to be stored therein at the time of each clock, and is then transferred from the register R06 to the line buffer 111. Pixel data stored in the line buffer 111 (N-7) clocks ago is transferred to the register R10, which is timed to coincide with the transfer of the pixel data from the register R06 to the line buffer 111. Likewise, pixel data given from the register R16 is transferred to and stored in the line buffer 112, and is then transferred to the register R20 after the expiration of a time interval of (N-7) clocks. Pixel data given to the image memory 11 thereby passes through each register and each line buffer to be eventually stored in the register R66. The pixel data stored in the register 66 is abandoned when a next clock signal is given.

Thus in the 49 registers R00, R01, ... R66, pixel data are temporarily stored in a 7×7 square, at the center of which the register R33 storing a pixel of interest is located. This 7×7 square is applied for use in the filtering of the first preferred embodiment.

Figure 3:
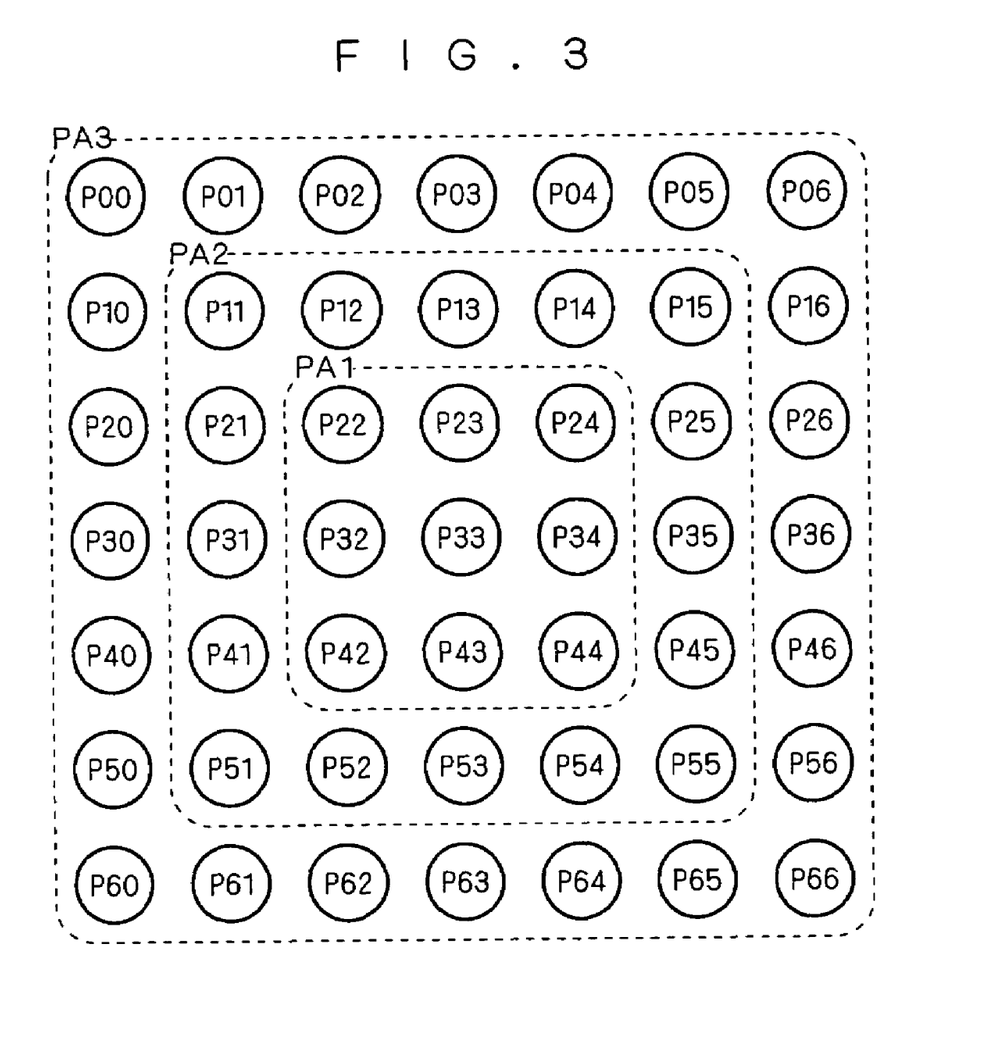
FIG. 3 shows pixel arrangement in squares.

When pixel data stored in each register RXY (X and Y are integers from 0 to 6) is represented as PXY, pixel data stored in the registers R00, R01, ... R66 are respectively represented as P00, P01, . . . P66. The resultant pixel arrangement in squares relative to a pixel of interest located at the center is shown in FIG. 3. The pixel data P33 corresponds to the data of a pixel of interest.

Three pixel groups relative to the pixel of interest located at the center are defined as follows. A first pixel group PA1 contains pixels arranged in a 3×3 square relative to the pixel of interest with the pixel data P33 located at the center. More specifically, the pixel group PA1 contains 9 pixels having pixel data P22, P23, P24, P32, P33, P34, P42, P43 and P44. A second pixel group PA2 contains pixels arranged in a 5×5 square relative to the pixel of interest with the pixel data P33 located at the center. More specifically, the pixel group PA2 contains 25 pixels having pixel data P11 through P15, P21 through P25, P31 through P35, P41 through P45 and P51 through P55. A third pixel group PA3 contains pixels arranged in a 7×7 square relative to the pixel of interest with the pixel data P33 located at the center. More specifically, the pixel group PA3 contains 49 pixels having pixel data P00 through P06, P10 through P16, P20 through P26, P30 through P36, P40 through P46, P50 through P56, and P60 through P66. Namely, the second pixel group PA2 contains the first pixel group PA1, and the third pixel group PA3 contains the second pixel group PA2.

Figure 4:
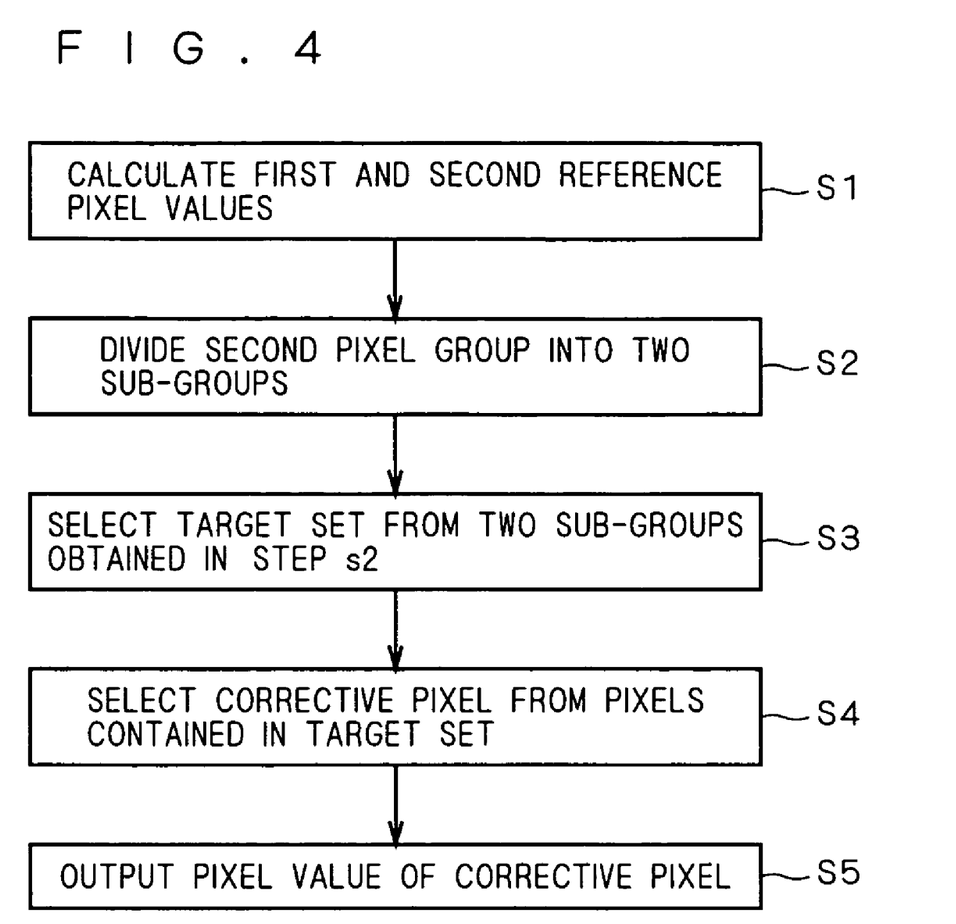
FIG. 4 is a flow chart showing an image filtering method according to the preferred embodiments of the present invention.

FIG. 4 is a flow chart showing an image filtering method according to the first preferred embodiment. With reference to FIGS. 1 and 4, in step s1, the reference value calculation circuit 12 receives the pixel data P00, P01, ... P66 of 49 pixels respectively stored in the registers R00, R01, ... R66. Namely, pixel data in a 7×7 square containing the pixel data P33 of the pixel of interest and those of its neighboring pixels are received.

Next, the reference value calculation circuit 12 calculates a first reference pixel value BV1 based on the first pixel group PA1, and a second reference pixel value BV2 based on the third pixel group PA3. The first reference pixel value BV1 is the average pixel value of all the pixels contained in the first pixel group PA1. The second reference pixel value BV2 is the average pixel value of all the pixels contained in the third pixel group PA3.

The reference value calculation circuit 12 outputs the calculated second reference pixel value BV2 to the judgment circuit 13, and outputs the calculated first reference pixel value BV1 to the difference pixel value calculation circuit 14.

Next, in step s2, the judgment circuit 13 receives the pixel data of the 25 pixels contained in the second pixel group PA2 from the image memory 11. The pixel values of these 25 pixels are each compared in magnitude with the second reference pixel value BV2. Then the second pixel group PA2 is divided into two sub-groups: one sub-group contains pixels having pixel values greater than the second reference pixel value BV2; and the other sub-group contains pixels having pixel values smaller than the second reference pixel value BV2. Then in step s3, one of these sub-groups containing the pixel data P33 of the pixel of interest is selected as a target set EA. To describe this from a different view, the pixel value of the pixel data P33 and the second reference pixel value BV2 are compared in magnitude. When the pixel value of the pixel data P33 is greater than the second reference pixel value BV2, a set of pixels with pixel values greater than the second reference pixel value BV2 is selected as the target set EA. Conversely, when the pixel value of the pixel data P33 is smaller than the second reference pixel value BV2, a set of pixels with pixel values smaller than the second reference pixel value BV2 is selected as the target set EA.

After the target set EA is selected, the judgment circuit 13 outputs the information related to the target set EA to the difference pixel value calculation circuit 14. The information related to the target set EA specifies pixels contained in the target set EA or, specifies registers that store pixels contained in the target set EA.

Next, in step s4, the difference pixel value calculation circuit 14 receives the pixel data of pixels contained in the target set EA. Then the absolute value DV of the difference between the pixel value of each pixel in the target set EA and the first reference pixel value BV1 is calculated. When two pixel values targeted for the calculation are identified as PV1 and PV2, the absolute value of difference is obtained by calculating the difference between these two pixel values (PV1−PV2), and then calculating the absolute value of this difference (|PV1−PV2|). The difference pixel value calculation circuit 14 outputs the absolute value DV obtained with respect to each pixel in the target set EA to the minimum value selection circuit 15. The difference pixel value calculation circuit 14 also outputs information together with the absolute value DV that indicates the corresponding pixel subjected to the calculation.

The minimum value selection circuit 15 selects a minimum from the received absolute values DV. When the pixel data PXY giving the minimum absolute value DV is specified, the minimum value selection circuit 15 obtains this pixel data PXY as corrective pixel data from the image memory 11. Then in step s5, the minimum value selection circuit 15 outputs the pixel data PXY as corrective pixel data that has been received from the image memory 11.

The corrective pixel data given from the image filter 10 is applied for use as the pixel value of the pixel of interest, whereby filtering is completed with respect to the pixel of interest. Subsequently, new pixel data is given to the image memory 11 triggered by a next clock signal, and pixel data stored in each register moves to a post-stage register. The pixel having the new pixel data replacing the former pixel data in the register R33 is applied for use as a new pixel of interest to realize the same filtering.

Figure 5:
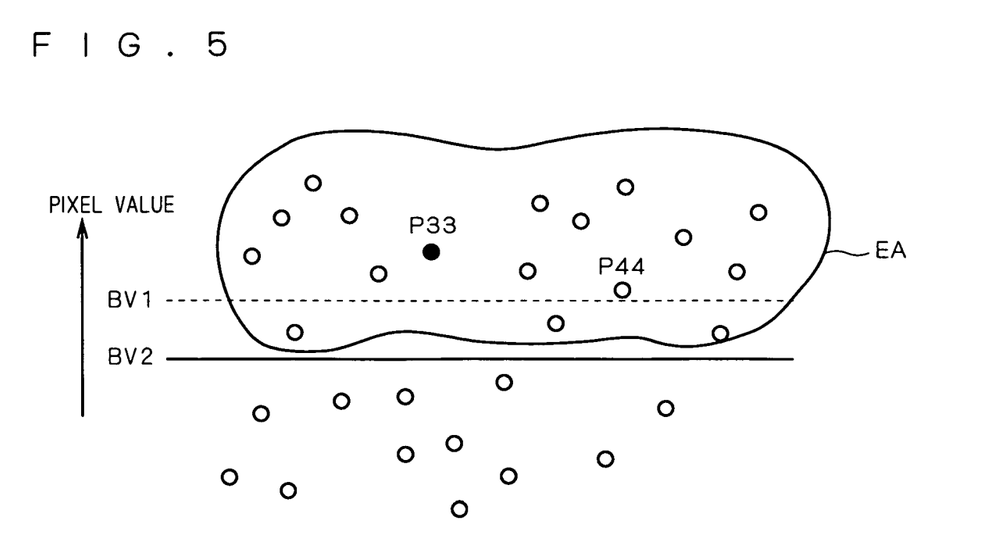
FIG. 5 simply illustrates filtering in a first preferred embodiment of the present invention.

FIG. 5 simply illustrates the filtering in the first preferred embodiment. In FIG. 5, small circles show the pixels contained in the second pixel group PA2. These pixels are located based on the magnitude of the pixel values thereof (pixels on the upper side of FIG. 5 have greater pixel values). The second pixel group PA2 is divided into two sub-groups with respect to the second reference pixel value BV2. The sub-group including the pixel of interest having the pixel data P33 is selected as the target set EA. A pixel having a pixel value closest to the first reference pixel value BV1 (in FIG. 5, pixel data P44) is selected as a corrective pixel from the target set EA.

Pixel data to be subjected to the filtering has not been specifically limited. As an example, brightness data may be applied for use in the processing. Alternatively, when a color image is a target for the processing, data of its color component may be employed. Still alternatively, data of several color components may be employed.

As discussed, according to the first preferred embodiment, the second reference pixel value BV2 is calculated based on the third pixel group PA3 covering a wide area in the neighborhood of a pixel of interest, and the target set EA is determined based on the second reference pixel value BV2. This means pixel variations in the wide area in the neighborhood of the pixel of interest can be taken into consideration for defining the target set EA. The first reference pixel value BV1 is calculated based on the first pixel group PA1 covering a limited area in the neighborhood of the pixel of interest, and a pixel with a value close to the first reference pixel value BV1 is applied for use as a corrective pixel. Thus the corrective pixel can be responsive to local pixel variations around the pixel of interest. Further, the target set EA is selected from the second pixel group PA2 covering an area smaller than that of the third pixel group PA3. Thus the required amount of calculation at the difference pixel value calculation circuit 14 and the minimum value selection circuit 15 can be reduced.

Next, modifications of the image filter 10 according to the first preferred embodiment will be described. In the foregoing description of the first preferred embodiment, the average values in the first pixel group PA1 and third pixel group PA3 are respectively applied as the first and second reference pixel values BV1 and BV2. The reference pixel values BV1 and BV2 may be obtained by alternative calculation.

A first modification employs a weighted average value. By way of example, a weighting factor may be determined based on a distance from the pixel of interest with the pixel data P33: a pixel value of a pixel close to the pixel of interest with the pixel data P33 is given a high weighting factor whereas a pixel value of a pixel far from the pixel of interest is given a low weighting factor. Thereafter the average of the weighted pixel values is calculated. As a specific example, the pixel of interest is given a weighting factor 3, eight pixels with the pixel data P22, P23, P24, P32, P34, P42, P43 and P44 adjacent to the pixel of interest are each given a weighting factor 2, and the pixels arranged outside these eight pixels are each given a weighting factor 1. The pixel values of these pixels are multiplied by the respective weighting factors and the resultant pixel values are added. Then the sum is divided by the number of pixels to obtain a weighted average of pixel values.

A second modification employs a median value. Pixels values of a pixel of interest and its neighboring pixels are sorted in numerical order, and the middle pixel value is applied for use as a reference pixel value.

A third modification employs a weighted median value. As an example, assuming that the pixel of interest with the pixel data P33 is given a weighting factor 2, and that eight pixels with the pixel data P22, P23, P24, P32, P34, P42, P43 and P44 adjacent to the pixel of interest are each given a weighting factor 1, the weighted median value of the first pixel group PA1 is calculated. In this case, considering the pixel of interest as two pixels, the pixel values of the ten pixels with the pixel data P22, P23, P24, P32, P33, P33, P34, P42, P43 and P44 are sorted in numerical order. The middle pixel value is applied for use as a reference pixel value.

A reference pixel value may be calculated by any of the first, second and third modifications. As an example, either the first or second reference pixel value PA1 or PA2 may be calculated by any of the first, second and third modifications. Alternatively, both the first and second reference pixel values PA1 and PA2 may be calculated by any of the first, second and third modifications.

Second Preferred Embodiment

Next, a second preferred embodiment of the present invention will be described. Like in the first preferred embodiment, pixel data are stored in the image memory 11 and the reference value calculation circuit 12 calculates the first and second reference pixel values BV1 and BV2 in step s1. Then in step s2, the judgment circuit 13 receives the pixel data contained in the second pixel group PA2 from the image memory 11, and divides the second pixel group PA2 into two sub-groups with respect to the second reference pixel value BV2.

Next, in step s3, the judgment circuit 13 selects one of these two sub-groups containing a larger number of pixels as the target set EA. Namely, of the sub-group of pixels with pixel values greater than the second reference pixel value BV2 and the sub-group of pixels with pixel values smaller than the reference pixel value BV2, the sub-group containing a larger number of pixels is selected as the target set EA.

The subsequent processes in steps s4 and s5 described in the first preferred embodiment are also followed in the second preferred embodiment. The difference pixel value calculation circuit 14 calculates the absolute value DV of the difference between the pixel value of each pixel contained in the target set EA and the first reference pixel value BV1. The minimum value selection circuit 15 selects a minimum from the absolute values DV, to thereby specify a corrective pixel.

Figure 6:
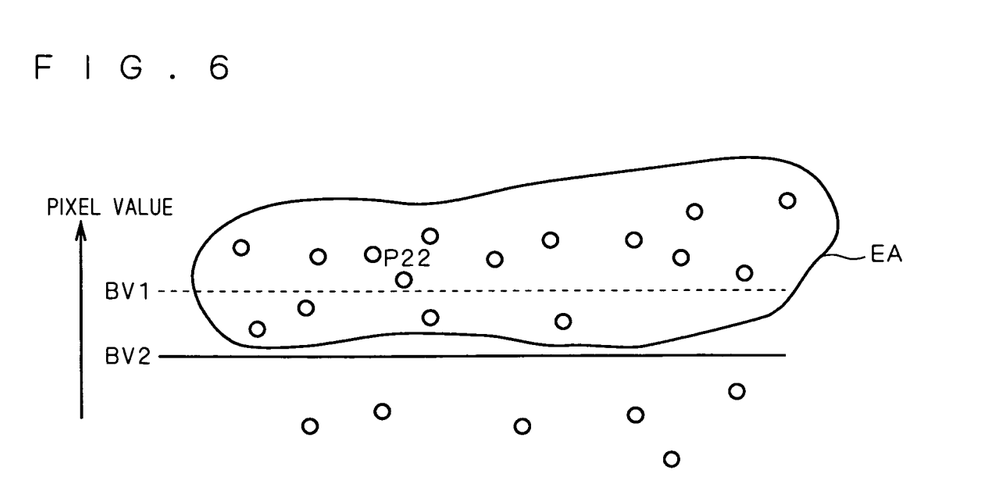
FIG. 6 simply illustrates filtering in a second preferred embodiment of the present invention.

FIG. 6 simply illustrates the filtering in the second preferred embodiment. In FIG. 6, the second pixel group PA2 is divided into two sub-groups with respect to the second reference pixel value BV2. The sub-group including a larger number of pixels is selected as the target set EA. A pixel having a pixel value closest to the first reference pixel value BV1 (in FIG. 6, a pixel with pixel data P22) is selected as a corrective pixel from the target set EA.

As discussed, according to the second preferred embodiment, the second reference pixel value BV2 is calculated based on the third pixel group PA3 covering a wide area in the neighborhood of a pixel of interest, and the target set EA is determined based on the second reference pixel value BV2. This means pixel variations in the wide area in the neighborhood of the pixel of interest can be taken into consideration for defining the target set EA. The first reference pixel value BV1 is calculated based on the first pixel group PA1 covering a limited area in the neighborhood of the pixel of interest, and a pixel with a value close to the first reference pixel value BV1 is applied for use as a corrective pixel. Thus the corrective pixel can be responsive to local pixel variations around the pixel of interest. Further, the target set EA is selected from the second pixel group PA2 covering an area smaller than that of the third pixel group PA3. Thus the required amount of calculation at the difference pixel value calculation circuit 14 and the minimum value selection circuit 15 can be reduced.

Like in the first preferred embodiment, a weighted average value, a median value or a weighted median value may be applied for use as the first and second reference pixel values BV1 and BV2.

Third Preferred Embodiment

Next, a third preferred embodiment of the present invention will be described. Like in the first preferred embodiment, pixel data are stored in the image memory 11 and the reference value calculation circuit 12 calculates the first and second reference pixel values BV1 and BV2 in step s1. Then in step s2, the judgment circuit 13 receives the pixel data contained in the second pixel group PA2 from the image memory 11, and divides the second pixel group PA2 into two sub-groups with respect to the second reference pixel value BV2.

Then in step s3, the judgment circuit 12 selects one of these two sub-groups as the target set EA. That is, the judgment circuit 12 selects either the sub-group containing pixels with pixel values greater than the second reference pixel value BV2 or the sub-group containing pixels with pixel values smaller than the second reference pixel value BV2 as the target set EA. In the sub-group selected as the target set EA, the first reference pixel value BV1 exists within a range of not less than a minimum pixel value and not more than a maximum pixel value. To describe this from a different view, the first reference pixel value BV1 and the second reference pixel value BV2 are compared in magnitude. When the first reference pixel value BV1 is greater than the second reference pixel value BV2, the sub-group containing pixels with pixel values greater than the second reference pixel value BV2 is selected as the target set EA. When the first reference pixel value BV1 is smaller than the second reference pixel value BV2, the sub-group containing pixels with pixel values smaller than the second reference pixel value BV2 is selected as the target set EA. Both the first and second reference pixel values BV1 and BV2 are given from the reference value calculation circuit 12 to the judgment circuit 13 in the third preferred embodiment, whereas only the second reference pixel value BV2 is shown to be given from the reference value calculation circuit 12 to the judgment circuit 13 in FIG. 1.

The subsequent processes in steps s4 and s5 described in the first preferred embodiment are also followed in the second preferred embodiment. The difference pixel value calculation circuit 14 calculates the absolute value DV of the difference between the pixel value of each pixel contained in the target set EA and the first reference pixel value BV1. The minimum value selection circuit 15 selects a minimum from the absolute values DV, to thereby specify a corrective pixel.

Figure 7:
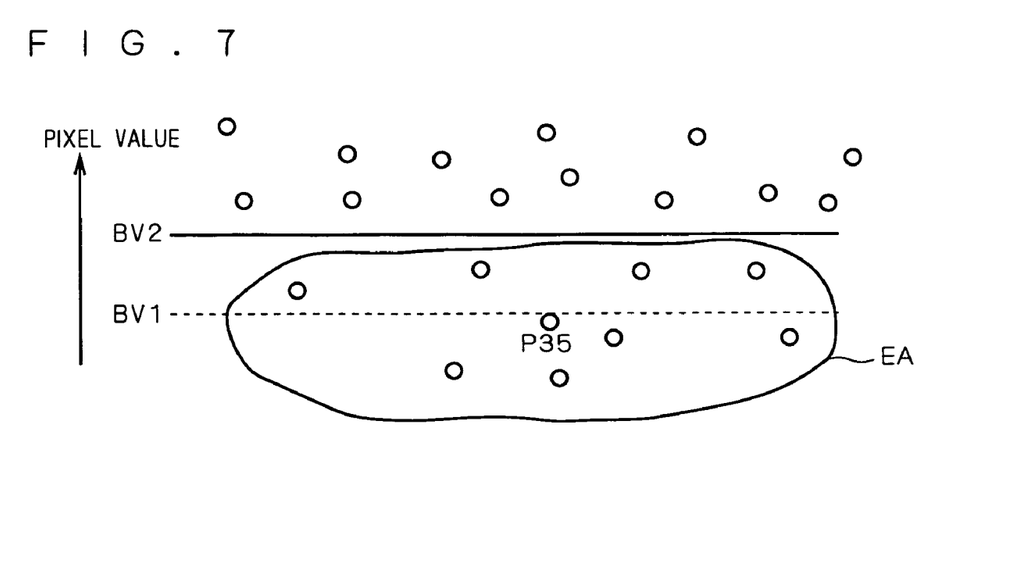
FIG. 7 simply illustrates filtering in a third preferred embodiment of the present invention.

FIG. 7 simply illustrates the filtering in the third preferred embodiment. In FIG. 7, the second pixel group PA2 is divided into two sub-groups with respect to the second reference pixel value BV2. One of these two sub-groups is selected as the target set EA. In the sub-group selected as the target set EA, the first reference pixel value BV1 exists within a range of not less than a minimum pixel value and not more than a maximum pixel value. A pixel with a pixel value closest to the first reference pixel value BV1 (in FIG. 7, a pixel with pixel data P35) is selected as a corrective pixel from the target set EA.

As discussed, according to the third preferred embodiment, the second reference pixel value BV2 is calculated based on the third pixel group PA3 covering a wide area in the neighborhood of a pixel of interest, and the target set EA is determined based on the second reference pixel value BV2. This means pixel variations in the wide area in the neighborhood of the pixel of interest can be taken into consideration for defining the target set EA. The first reference pixel value BV1 is calculated based on the first pixel group PA1 covering a limited area in the neighborhood of the pixel of interest, and a pixel with a value close to the first reference pixel value BV1 is applied for use as a corrective pixel. Thus the corrective pixel can be responsive to local pixel variations around the pixel of interest. Further, the target set EA is selected from the second pixel group PA2 covering an area smaller than that of the third pixel group PA3. Thus the required amount of calculation at the difference pixel value calculation circuit 14 and the minimum value selection circuit 15 can be reduced.

Like in the first preferred embodiment, a weighted average value, a median value or a weighted median value may be applied for use as the first and second reference pixel values BV1 and BV2.

Other Modifications

Figure 9:
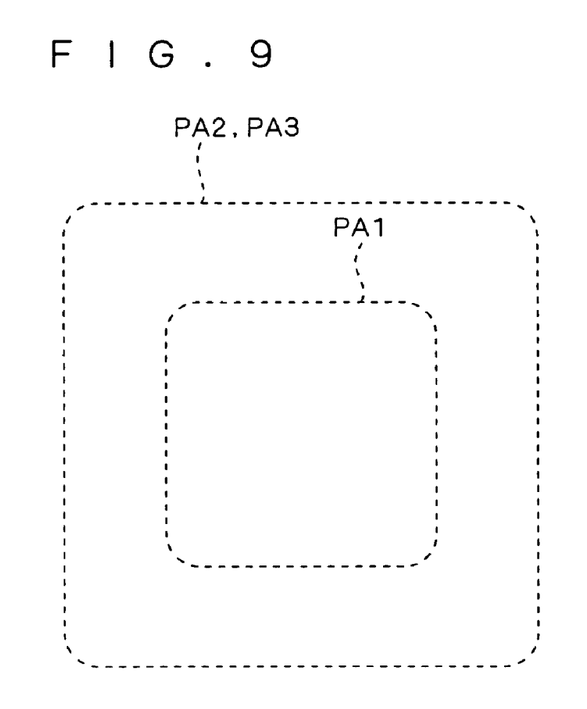
Figure 10:
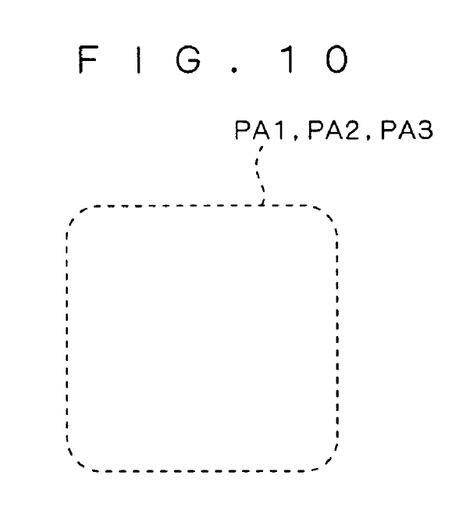

In each of the preferred embodiments described above, the second pixel group PA2 contains the first pixel group PA1 while covering an area wider than that of the first pixel group PA1. Further, the third pixel group PA3 contains the second pixel group PA2 while covering an area wider than that of the second pixel group PA2. Modifications of the relationships among the first, second and third pixel groups PA1, PA2 and PA3 may be made as shown in FIGS. 8, 9 and 10.

Figure 8:
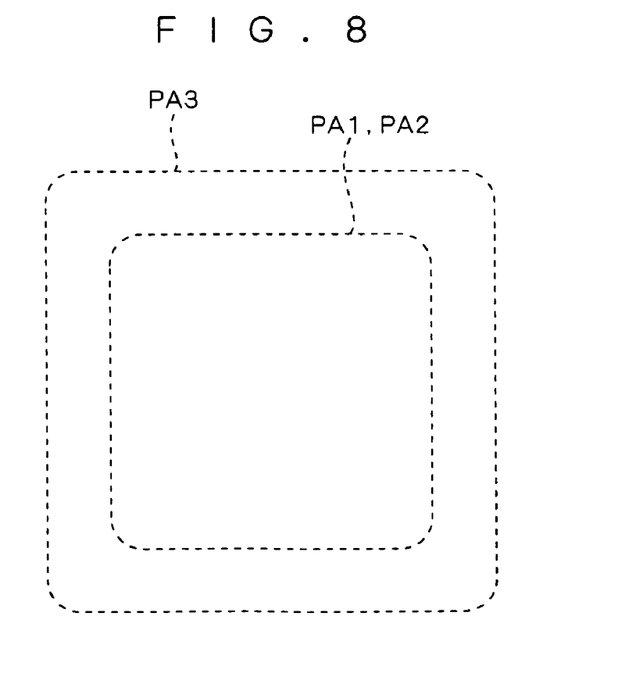
FIGS. 8, 9, 10 and 11 each show a modification of the relationship among pixel groups.

FIG. 8 shows a modification in which the first and second pixel groups PA1 and PA2 consists of the same pixels. FIG. 9 shows a modification in which the second and third pixel groups PA2 and PA3 consists of the same pixels. FIG. 10 shows a modification in which the first, second and third pixel groups PA1, PA2 and PA3 consists of the same pixels. In either case, the second reference pixel value BV2 is calculated based on the third pixel group PA3, and the second pixel group PA2 is divided with respect to the second reference pixel value BV2 to define the target set EA. The first reference pixel value BV1 is calculated based on the first pixel group PA1, and a pixel with a pixel value close to the first reference pixel value BV1 is selected as a corrective pixel from the target set EA. The modified relationships among the pixel groups shown in FIGS. 8, 9 and 10 allow simpler processing relative to the first, second and third preferred embodiments, while they may be less effective according to the type of images.

Pixel groups may be defined in different ways. The first, second and third pixel groups PA1, PA2 and PA3 have been described as being defined in squares. Alternatively, the first, second and third pixel groups PA1, PA2 and PA3 may be defined in circles or ovals, for example.

Figure 11:
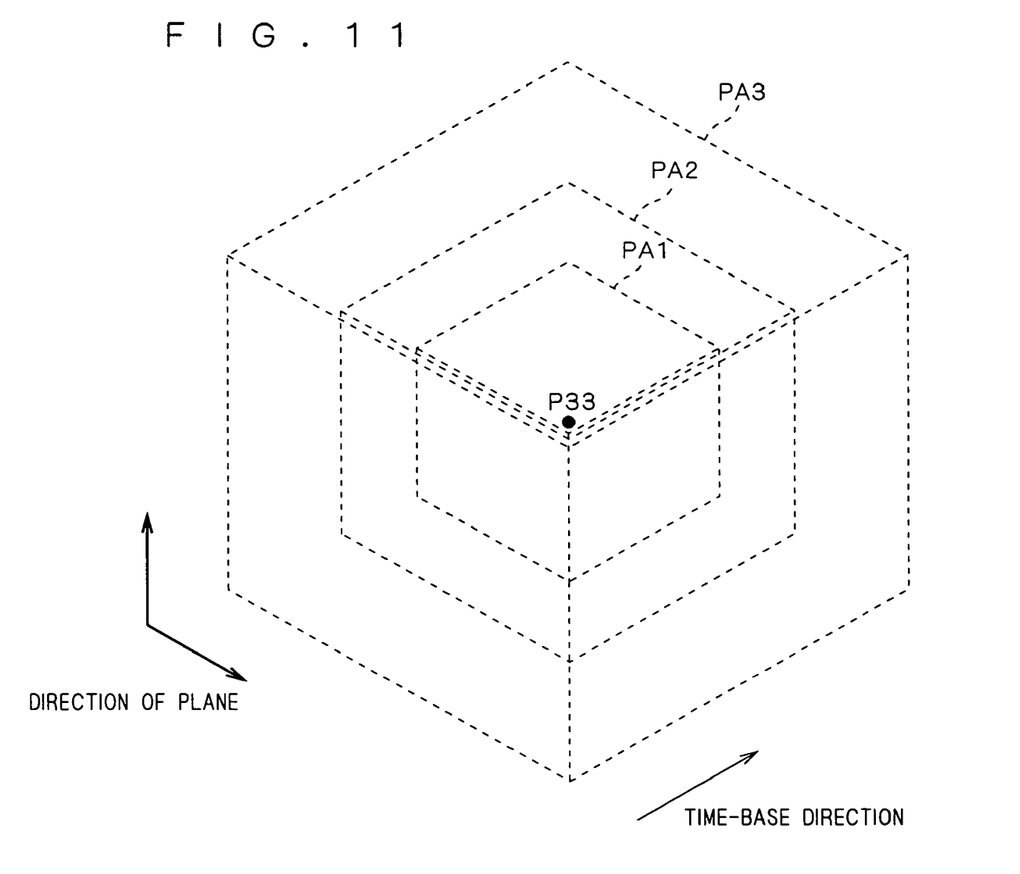

Still alternatively, a pixel group may be defined three-dimensionally. The three-dimensional pixel group is defined as containing pixels of a plurality of frames in a time-base direction in addition to pixels in the direction of a plane. FIG. 11 shows an example of three-dimensional pixel groups. FIG. 11 shows the first pixel group PA1 defined three-dimensionally and containing the pixel of interest with the pixel data P33, the second pixel group PA2 defined three-dimensionally and containing the first pixel group PA1, and the third pixel group PA3 defined three-dimensionally and containing the second pixel group PA2. In order to handle these pixel groups, an image memory should have registers and buffers for accumulating pixels of a plurality of frames in a time-base direction in addition to pixels in a planar region.

The first and second pixel groups PA1 and PA2 may be pixel groups in planar regions whereas only the third pixel group PA3 may be a three-dimensional pixel group. Alternatively, the first pixel group PA1 may be a pixel group in a planer region whereas the second and third pixel groups PA2 and PA3 may be three-dimensional pixel groups. Still alternatively, all the first, second and third pixel groups PA1, PA2 and PA3 may be three-dimensional pixel groups.

Figure 12:
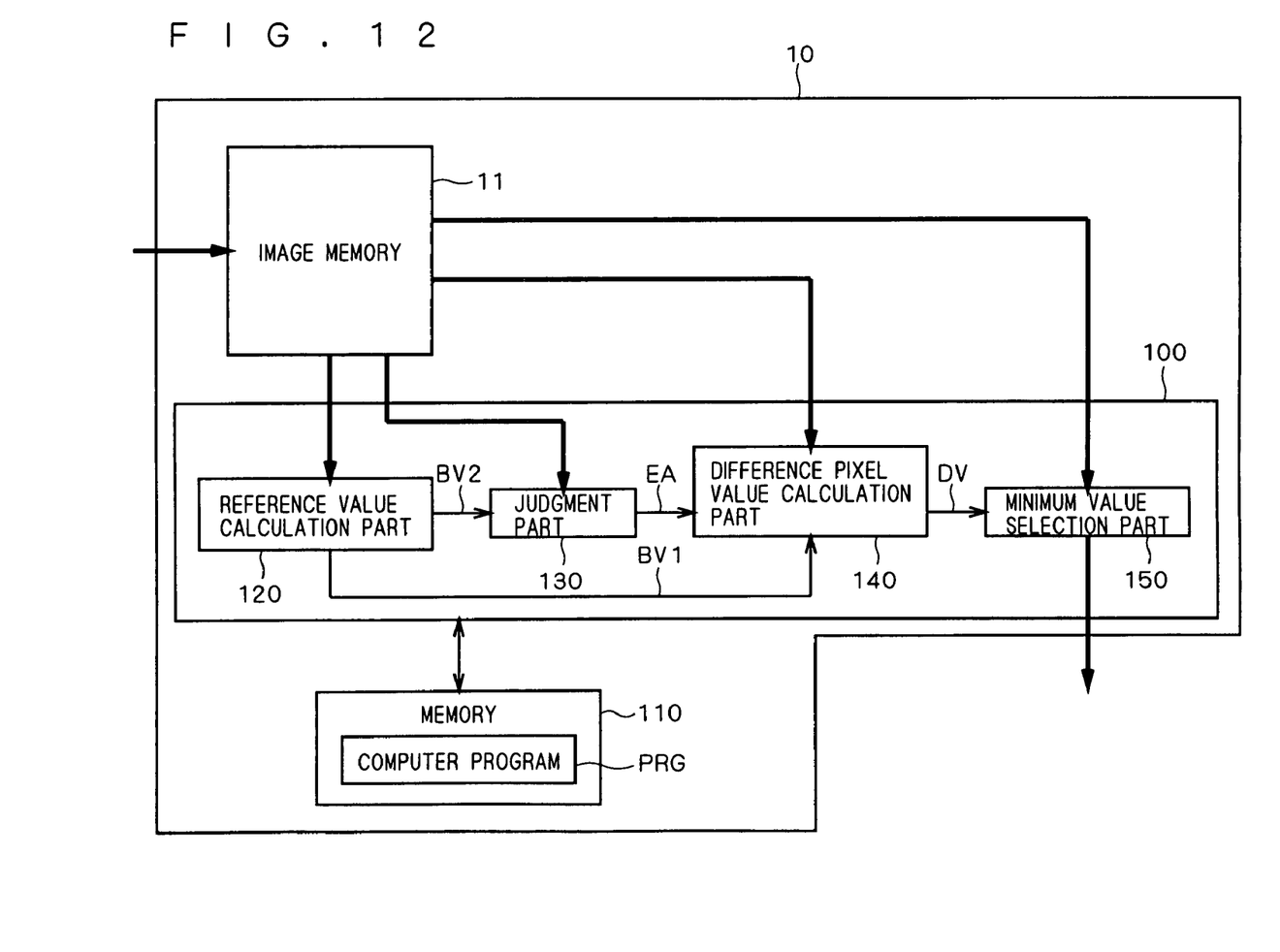
FIG. 12 shows a modification of the configuration of the image filter according to the preferred embodiments of the present invention.

In each of the preferred embodiments described above, the image filtering is realized by hardware circuits. Namely, the image filtering is realized by hardware circuits including the reference value calculation circuit 12, judgment circuit 13, difference pixel value calculation circuit 14, minimum value selection circuit 15 and the like. The processing at each of these circuits may be alternatively realized by a computer program. FIG. 12 is a block diagram showing the configuration of the image filter 10 according to such a modification. With reference to FIG. 12, the image filter 10 is a computer comprising the above-discussed image memory 11, a CPU 100 and a memory 110 storing a computer program PRG. The CPU 100 reads and executes the computer program PRG stored in the memory 110, whereby functional blocks including a reference value calculation part 120, a judgment part 130, a difference pixel value calculation part 140 and a minimum value selection part 150 are realized in the CPU 100. The reference value calculation part 120, judgment part 130, difference pixel value calculation part 140 and minimum value selection part 150 are responsible for the processing performed by the above-discussed reference value calculation circuit 12, judgment circuit 13, difference pixel value calculation circuit 14 and minimum value selection circuit 15, respectively. The CPU 100 thereby becomes operative to perform the above-described image filtering in each of the first, second and third preferred embodiments. The memory 110 may be a storage device contained on a substrate such as a ROM (read only memory). Alternatively, the memory 110 may be a recording medium capable of being detachably attached to the image filter 10 such as a CD-ROM or a flexible disk. In the description of each of the first, second and third preferred embodiments, the image memory 11 is formed by registers and line buffers. Alternatively, the image memory 11 may be a RAM having a large capacity for storing pixel data in a square. In this case, the pixel data stored in the RAM is processed by a computer program to realize image filtering.

While the invention has been shown and described in detail, the foregoing description is in all aspects illustrative and not restrictive. It is therefore understood that numerous modifications and variations can be devised without departing from the scope of the invention.

What is claimed is:

1. An image filter for filtering a pixel of interest using said pixel of interest and its neighboring pixels, in which a first pixel group containing said pixel of interest, a second pixel group containing said first pixel group and a third pixel group containing said second pixel group are defined relative to said pixel of interest, said image filter comprising:

a calculation part for calculating a first reference pixel value based on pixels contained in said first pixel group, and calculating a second reference pixel value based on pixels contained in said third pixel group;

a judgment part for dividing said second pixel group into two sub-groups, and selecting one of said two sub-groups containing said pixel of interest as a target set, said two sub-groups including one sub-group containing pixels with pixel values greater than said second reference pixel value and the other sub-group containing pixels with pixel values smaller than said second reference pixel value;

a selection part for selecting a pixel with a pixel value closest to said first reference pixel value as a corrective pixel from pixels contained in said target set; and an output part for outputting the pixel value of said corrective pixel as the pixel value of said pixel of interest.

2. An image filter for filtering a pixel of interest using said pixel of interest and its neighboring pixels, in which a first pixel group containing said pixel of interest, a second pixel group containing said first pixel group and a third pixel group containing said second pixel group are defined relative to said pixel of interest, said image filter comprising:

a calculation part for calculating a first reference pixel value based on pixels contained in said first pixel group, and calculating a second reference pixel value based on pixels contained in said third pixel group;

a judgment part for dividing said second pixel group into two sub-groups, and selecting one of said two sub-groups containing a larger number of pixels as a target set, said two sub-groups including one sub-group containing pixels with pixel values greater than said second reference pixel value and the other sub-group containing pixels with pixel values smaller than said second reference pixel value;

a selection part for selecting a pixel with a pixel value closest to said first reference pixel value as a corrective pixel from pixels contained in said target set; and an output part for outputting the pixel value of said corrective pixel as the pixel value of said pixel of interest.

3. An image filter for filtering a pixel of interest using said pixel of interest and its neighboring pixels, in which a first pixel group containing said pixel of interest, a second pixel group containing said first pixel group and a third pixel group containing said second pixel group are defined relative to said pixel of interest, said image filter comprising:

a calculation part for calculating a first reference pixel value based on pixels contained in said first pixel group, and calculating a second reference pixel value based on pixels contained in said third pixel group;

a judgment part for dividing said second pixel group into two sub-groups, and selecting one of said two sub-groups in which said first reference pixel value exists within a range of not less than a minimum pixel value and not more than a maximum pixel value as a target set, said two sub-groups including one sub-group containing pixels with pixel values greater than said second reference pixel value and the other sub-group containing pixels with pixel values smaller than said second reference pixel value;

a selection part for selecting a pixel with a pixel value closest to said first reference pixel value as a corrective pixel from pixels contained in said target set; and an output part for outputting the pixel value of said corrective pixel as the pixel value of said pixel of interest.

4. The image filter according to claim 1, wherein said second reference pixel value is an average pixel value of said pixels contained in said third pixel group.

5. The image filter according to claim 2, wherein said second reference pixel value is an average pixel value of said pixels contained in said third pixel group.

6. The image filter according to claim 3, wherein said second reference pixel value is an average pixel value of said pixels contained in said third pixel group.

7. The image filter according to claim 1, wherein said second reference pixel value is a median pixel value of said pixels contained in said third pixel group.

8. The image filter according to claim 2, wherein said second reference pixel value is a median pixel value of said pixels contained in said third pixel group.

9. The image filter according to claim 3, wherein said second reference pixel value is a median pixel value of said pixels contained in said third pixel group.

10. The image filter according to claim 1, wherein said first reference pixel value is an average pixel value of said pixels contained in said first pixel group.

11. The image filter according to claim 2, wherein said first reference pixel value is an average pixel value of said pixels contained in said first pixel group.

12. The image filter according to claim 3, wherein said first reference pixel value is an average pixel value of said pixels contained in said first pixel group.

13. The image filter according to claim 1, wherein said first reference pixel value is a median pixel value of said pixels contained in said first pixel group.

14. The image filter according to claim 2, wherein said first reference pixel value is a median pixel value of said pixels contained in said first pixel group.

15. The image filter according to claim 3, wherein said first reference pixel value is a median pixel value of said pixels contained in said first pixel group.

16. The image filter according to claim 4, wherein said average pixel value is calculated on the basis of pixel values of said pixels in said third pixel group, said pixel values being given weights according to distances from said pixel of interest.

17. The image filter according to claim 5, wherein said average pixel value is calculated on the basis of pixel values of said pixels in said third pixel group, said pixel values being given weights according to distances from said pixel of interest.

18. The image filter according to claim 6, wherein said average pixel value is calculated on the basis of pixel values of said pixels in said third pixel group, said pixel values being given weights according to distances from said pixel of interest.

19. The image filter according to claim 10, wherein said average pixel value is calculated on the basis of pixel values of said pixels in said first pixel group, said pixel values being given weights according to distances from said pixel of interest.

20. The image filter according to claim 11, wherein said average pixel value is calculated on the basis of pixel values of said pixels in said first pixel group, said pixel values being given weights according to distances from said pixel of interest.

21. The image filter according to claim 12, wherein said average pixel value is calculated on the basis of pixel values of said pixels in said first pixel group, said pixel values being given weights according to distances from said pixel of interest.

22. The image filter according to claim 7, wherein said median pixel value is calculated on the basis of pixel values of said pixels in said third pixel group, said pixel values being given weights according to distances from said pixel of interest.

23. The image filter according to claim 8, wherein said median pixel value is calculated on the basis of pixel values of said pixels in said third pixel group, said pixel values being given weights according to distances from said pixel of interest.

24. The image filter according to claim 9, wherein said median pixel value is calculated on the basis of pixel values of said pixels in said third pixel group, said pixel values being given weights according to distances from said pixel of interest.

25. The image filter according to claim 13, wherein said median pixel value is calculated on the basis of pixel values of said pixels in said first pixel group, said pixel values being given weights according to distances from said pixel of interest.

26. The image filter according to claim 14, wherein said median pixel value is calculated on the basis of pixel values of said pixels in said first pixel group, said pixel values being given weights according to distances from said pixel of interest.

27. The image filter according to claim 15, wherein said median pixel value is calculated on the basis of pixel values of said pixels in said first pixel group, said pixel values being given weights according to distances from said pixel of interest.

28. The image filter according to claim 1, wherein said first pixel group and said second pixel group consists of the same pixels.

29. The image filter according to claim 2, wherein said first pixel group and said second pixel group consists of the same pixels.

30. The image filter according to claim 3, wherein said first pixel group and said second pixel group consists of the same pixels.

31. The image filter according to claim 1, wherein said second pixel group and said third pixel group consists of the same pixels.

32. The image filter according to claim 2, wherein said second pixel group and said third pixel group consists of the same pixels.

33. The image filter according to claim 3, wherein said second pixel group and said third pixel group consists of the same pixels.

34. The image filter according to claim 1, wherein said first pixel group, said second pixel group and said third pixel group consists of the same pixels.

35. The image filter according to claim 2, wherein said first pixel group, said second pixel group and said third pixel group consists of the same pixels.

36. The image filter according to claim 3, wherein said first pixel group, said second pixel group and said third pixel group consists of the same pixels.

37. The image filter according to claim 1, wherein said third pixel group, or said second and said third pixel groups, or said first, said second and said third pixel groups are three-dimensional pixel groups containing pixels of a plurality of frames in a time-base direction.

38. The image filter according to claim 2, wherein said third pixel group, or said second and said third pixel groups, or said first, said second and said third pixel groups are three-dimensional pixel groups containing pixels of a plurality of frames in a time-base direction.

39. The image filter according to claim 3, wherein said third pixel group, or said second and said third pixel groups, or said first, said second and said third pixel groups are three-dimensional pixel groups containing pixels of a plurality of frames in a time-base direction.

40. An image filtering method for filtering a pixel of interest using said pixel of interest and its neighboring pixels, in which a first pixel group containing said pixel of interest, a second pixel group containing said first pixel group and a third pixel group containing said second pixel group are defined relative to said pixel of interest, said method comprising:
- calculating a first reference pixel value based on pixels contained in said first pixel group;
- calculating a second reference pixel value based on pixels contained in said third pixel group;
- dividing said second pixel group into two sub-groups, and selecting one of said two sub-groups containing said pixel of interest as a target set, said two sub-groups including one sub-group containing pixels with pixel values greater than said second reference pixel value and the other sub-group containing pixels with pixel values smaller than said second reference pixel value;
- selecting, by a selection circuit, a pixel with a pixel value closest to said first reference pixel value as a corrective pixel from pixels contained in said target set; and
- outputting the pixel value of said corrective pixel as the pixel value of said pixel of interest.

41. An image filtering method for filtering a pixel of interest using said pixel of interest and its neighboring pixels, in which a first pixel group containing said pixel of interest, a second pixel group containing said first pixel group and a third pixel group containing said second pixel group are defined relative to said pixel of interest, said method comprising:
- calculating a first reference pixel value based on pixels contained in said first pixel group;
- calculating a second reference pixel value based on pixels contained in said third pixel group;
- dividing said second pixel group into two sub-groups, and selecting one of said two sub-groups containing a larger number of pixels as a target set, said two sub-groups including one sub-group containing pixels with pixel values greater than said second reference pixel value and the other sub-group containing pixels with pixel values smaller than said second reference pixel value;
- selecting, by a selection circuit, a pixel with a pixel value closest to said first reference pixel value as a corrective pixel from pixels contained in said target set; and
- outputting the pixel value of said corrective pixel as the pixel value of said pixel of interest.

42. An image filtering method for filtering a pixel of interest using said pixel of interest and its neighboring pixels, in which a first pixel group containing said pixel of interest, a second pixel group containing said first pixel group and a third pixel group containing said second pixel group are defined relative to said pixel of interest, said method comprising:
- calculating a first reference pixel value based on pixels contained in said first pixel group;
- calculating a second reference pixel value based on pixels contained in said third pixel group;
- dividing said second pixel group into two sub-groups, and selecting one of said two sub-groups in which said first reference pixel value exists within a range of not less than a minimum pixel value and not more than a maximum pixel value as a target set, said two sub-groups including one sub-group containing pixels with pixel values greater than said second reference pixel value and the other sub-group containing pixels with pixel values smaller than said second reference pixel value;
- selecting, by a selection circuit, a pixel with a pixel value closest to said first reference pixel value as a corrective pixel from pixels contained in said target set; and outputting the pixel value of said corrective pixel as the pixel value of said pixel of interest.

43. A computer-readable memory having embedded therein instructions, which when executed by a processor, cause the processor to implement an image filtering method for filtering a pixel of interest using said pixel of interest and its neighboring pixels, said method comprising:
  calculating a first reference pixel value based on a pixel value of each pixel stored in an image memory and forming a first pixel group containing said pixel of interest;
  calculating a second reference pixel value based on the pixel value of each pixel stored in said image memory and forming a third pixel group, said third pixel group containing a second pixel group inclusive of said first pixel group;
  dividing said second pixel group into two sub-groups based on the pixel value of each pixel stored in said image memory and forming said second pixel group, and selecting one of said two sub-groups containing said pixel of interest as a target set, said two sub-groups including one sub-group containing pixels with pixel values greater than said second reference pixel value and the other sub-group containing pixels with pixel values smaller than said second reference pixel value;
  selecting a pixel with a pixel value closest to said first reference pixel value as a corrective pixel from pixels contained in said target set, based on the pixel value of each pixel stored in said image memory and forming said target set; and
  outputting the pixel value of said corrective pixel as the pixel value of said pixel of interest.

44. A computer-readable memory having embedded therein instructions, which when executed by a processor, cause the processor to implement an image filtering method for filtering a pixel of interest using said pixel of interest and its neighboring pixels, said method comprising:
  calculating a first reference pixel value based on a pixel value of each pixel stored in an image memory and forming a first pixel group containing said pixel of interest;
  calculating a second reference pixel value based on the pixel value of each pixel stored in said image memory and forming a third pixel group, said third pixel group containing a second pixel group inclusive of said first pixel group;
  dividing said second pixel group into two sub-groups based on the pixel value of each pixel stored in said image memory and forming said second pixel group, and selecting one of said two sub-groups containing a larger number of pixels as a target set, said two sub-groups including one sub-group containing pixels with pixel values greater than said second reference pixel value and the other sub-group containing pixels with pixel values smaller than said second reference pixel value;
  selecting a pixel with a pixel value closest to said first reference pixel value as a corrective pixel from pixels contained in said target set, based on the pixel value of each pixel stored in said image memory and forming said target set; and
  outputting the pixel value of said corrective pixel as the pixel value of said pixel of interest.

45. A computer-readable memory having embedded therein instructions, which when executed by a processor, cause the processor to implement an image filtering method for filtering a pixel of interest using said pixel of interest and its neighboring pixels, said method comprising:
  calculating a first reference pixel value based on a pixel value of each pixel stored in an image memory and forming a first pixel group containing said pixel of interest;
  calculating a second reference pixel value based on the pixel value of each pixel stored in said image memory and forming a third pixel group, said third pixel group containing a second pixel group inclusive of said first pixel group;
  dividing said second pixel group into two sub-groups based on the pixel value of each pixel stored in said image memory and forming said second pixel group, and selecting one of said two sub-groups in which said first reference pixel value exists within a range of not less than a minimum pixel value and not more than a maximum pixel value as a target set, said two sub-groups including one sub-group containing pixels with pixel values greater than said second reference pixel value and the other sub-group containing pixels with pixel values smaller than said second reference pixel value;
  selecting a pixel with a pixel value closest to said first reference pixel value as a corrective pixel from pixels contained in said target set, based on the pixel value of each pixel stored in said image memory and forming said target set; and
  outputting the pixel value of said corrective pixel as the pixel value of said pixel of interest.

* * * * *